United States Patent
Behrens et al.

(10) Patent No.: US 12,496,287 B2
(45) Date of Patent: Dec. 16, 2025

(54) COMPOSITIONS AND METHODS FOR TREATING MACROPHAGE ACTIVATION SYNDROME

(71) Applicant: THE CHILDREN'S HOSPITAL OF PHILADELPHIA, Philadelphia, PA (US)

(72) Inventors: Edward M. Behrens, West Chester, PA (US); Chhanda Biswas, Wynnewood, PA (US)

(73) Assignee: THE CHILDREN'S HOSPITAL OF PHILADELPHIA, Philadelphia, PA (US)

( * ) Notice: Subject to any disclaimer, the term of this patent is extended or adjusted under 35 U.S.C. 154(b) by 780 days.

(21) Appl. No.: 17/771,172

(22) PCT Filed: Nov. 9, 2020

(86) PCT No.: PCT/US2020/059614
§ 371 (c)(1),
(2) Date: Apr. 22, 2022

(87) PCT Pub. No.: WO2021/092536
PCT Pub. Date: May 14, 2021

(65) Prior Publication Data
US 2022/0362196 A1    Nov. 17, 2022

Related U.S. Application Data

(60) Provisional application No. 62/932,551, filed on Nov. 8, 2019.

(51) Int. Cl.
*A61K 31/225* (2006.01)
*A61K 45/06* (2006.01)
*A61P 37/00* (2006.01)

(52) U.S. Cl.
CPC ............ *A61K 31/225* (2013.01); *A61K 45/06* (2013.01); *A61P 37/00* (2018.01)

(58) Field of Classification Search
CPC .............................. A61K 31/225; A61P 37/00
USPC ........................................................ 514/547
See application file for complete search history.

(56) References Cited

U.S. PATENT DOCUMENTS

| | | |
|---|---|---|
| 8,669,281 B1 | 3/2014 | Zeidan et al. |
| 10,040,859 B2 | 8/2018 | Behrens et al. |
| 2012/0165404 A1 | 6/2012 | Lukashev |
| 2013/0216615 A1 | 8/2013 | Goldman |
| 2014/0093449 A1 | 4/2014 | Williams et al. |
| 2016/0214948 A1 | 7/2016 | Albrecht et al. |
| 2018/0117171 A1 | 5/2018 | Mooney et al. |
| 2019/0167638 A1 | 6/2019 | Rajasekhar |
| 2019/0256481 A1 | 8/2019 | Virsik et al. |

FOREIGN PATENT DOCUMENTS

WO    2019/173676 A1    9/2019

OTHER PUBLICATIONS

Biswas et al., "MonomethylFumarate as a Novel Therapy for Macrophage Activation Syndrome: Mechanism o fAction in an Animal Model", Oct. 3, 2019 (Oct. 3, 2019) ArthritisRheumatol. 2019;71(suppl10), retrieved on Mar. 17, 2025 from: https://www.google.com/search?rlz=1C1GCEAenUS884US884&biw=1313&bih=640&tbs=cdr %3A1%2Ccd_max%3A11%2F7%2F2019&ei=FKD4X7OblcirtQaloJ6ACw&q= %22macrophage+tactivation+syndrome%22+dimethyl+fumarate&oq=%22macrophage+activation+syndrome %22+dimethyl+fumarate&gs_lcp=CgZwc3ktYWIQAzoFCCEQqwJQw74EWOHgBGCO04gRoAHAAeACAAV6IAZECKkgEBNZgBAKABAaoBB2d3cy13aXrAAQE&sclient=psy-ab&ved=QahUKEwiz9YnF94zuAhXIVcOKHSWQB7AQ4dUDCAO&uact=5 https://acrabstracts.org/abstract/monomethy]-fumarate-as-a-novel-therapy-for-macrophage-activation-syndrome-mechanism-of-action-in-an-animal-model/.*

Biswas, et al., "Amelioration of Murine Macrophage Activation Syndrome by Monomethyl Fumarate in Both a Heme Oxygenase 1-Dependent and Heme Oxygenase 1-Independent Manner" Arthritis Rheumatol. (2021) 73(5):885-895.

Biswas, et al., "Monomethyl Fumarate as a Novel Therapy for Macrophage Activation Syndrome: Mechanism of Action in an Animal Model" Arthritis Rheumatol. (2019) 71 (suppl 10):Abstract 811; available at https://acrabstracts.org/abstract/monomethyl-fumarate-as-a-novel-therapy-for-macrophage-activation-syndrome-mechanism-of-action-in-an-animal-model/.

Gold, et al., "Long-term effects of delayed-release dimethyl fumarate in multiple sclerosis: Interim analysis of Endorse, a randomized extension study" Mult. Scler. (2017) 23(2):253-265.

Singh, et al., "Neuro-protective effect of monomethyl fumarate on ischemia reperfusion injury in rats: Role of Nrf2/HO1 pathway in peri-infarct region" Neurochem. Int. (2019) 126:96-108.

Behrens, et al., "Repeated TLR9 stimulation results in macrophage activation syndrome-like disease in mice" J. Clin. Invest. (2011) 121(6):2264-77.

Weaver, et al., "TLR9-mediated inflammation drives a Ccr2-independent peripheral monocytosis through enhanced extramedullary monocytopoiesis" Proc. Natl. Acad. Sci. (2016) 113(39):10944-9.

Yu, et al., "Sulforaphane Suppresses Hepatitis C Virus Replication by Up-Regulating Heme Oxygenase-1 Expression through PI3K/Nrf2 Pathway" PLoS One (2016) 11(3):e0152236.

Uddin, et al., "Carbon Monoxide Inhibits Tenascin-C Mediated Inflammation via IL-10 Expression in a Septic Mouse Model" Mediators Inflamm. (2015) 2015:613249.

(Continued)

*Primary Examiner* — Raymond J Henley, III
(74) *Attorney, Agent, or Firm* — Robert C. Netter, Jr.; Dann, Dorfman, Herrell & Skillman

(57) ABSTRACT

Compositions and methods for treating macrophage activation syndrome are provided.

8 Claims, 12 Drawing Sheets

(56) References Cited

OTHER PUBLICATIONS

Figure 1A:
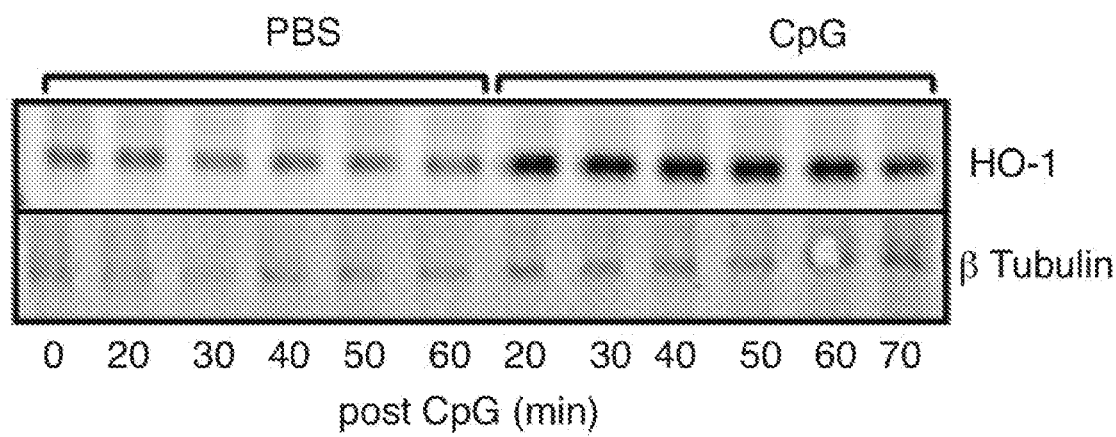

Lee, et al., "Heme oxygenase-1 mediates the anti-inflammatory effect of interleukin-10 in mice" Nat. Med. (2002) 8(3):240-6.

Drechsler, et al., "Heme oxygenase-1 mediates the anti-inflammatory effects of acute alcohol on IL-10 induction involving p38 MAPK activation in monocytes" J. Immunol. (2006) 177(4):2592-600.

Weaver, et al., "Hyperinflammation, rather than hemophagocytosis, is the common link between macrophage activation syndrome and hemophagocytic lymphohistiocytosis" Curr. Opin. Rheumatol. (2014) 26(5):562-9.

Weaver, et al., "Brief Report: Interferon-γ-Mediated Immunopathology Potentiated by Toll-Like Receptor 9 Activation in a Murine Model of Macrophage Activation Syndrome" Arthritis Rheumatol. (2019) 71(1):161-168.

Rood, et al., "IL-10 distinguishes a unique population of activated, effector-like CD8 + T cells in murine acute liver inflammation" J. Leukoc. Biol. (2017) 101(4):1037-1044.

Weaver, et al., "Weathering the storm: Improving therapeutic interventions for cytokine storm syndromes by targeting disease pathogenesis" Curr. Treatm. Opt. Rheumatol. (2017) 3(1):33-48.

\* cited by examiner

COMPOSITIONS AND METHODS FOR TREATING MACROPHAGE ACTIVATION SYNDROME

This application is a § 371 application of PCT/US2020/059614, filed Nov. 9, 2020, which claims priority under 35 U.S.C. § 119 (e) to U.S. Provisional Patent Application No. 62/932,551, filed Nov. 8, 2019. The foregoing application is incorporated by reference herein.

FIELD OF THE INVENTION

The present invention relates to the field of macrophage activation syndrome. Specifically, compositions and methods for inhibiting, treating, and/or preventing macrophage activation syndrome are disclosed.

BACKGROUND OF THE INVENTION

Several publications and patent documents are cited throughout the specification in order to describe the state of the art to which this invention pertains. Each of these citations is incorporated herein by reference as though set forth in full. Macrophage activation syndrome (MAS) is a deadly, systemic, cytokine storm syndrome typically seen in association with inflammatory rheumatologic conditions that presents with fever, bi-cytopenia, organomegaly, coagulopathy, and multi-system organ failure (Weaver, et al. (2014) Curr. Opin. Rheumatol., 26(5):562-9). Thus, MAS is similar to the related syndrome of hemophagocytic lymphohistiocytosis (HLH) in its clinical presentation. Hemophagocytes (macrophages seen to be consuming red blood cells) and elevated serum markers of iron metabolism such as ferritin are prominent in both conditions. In addition to elevated ferritin, MAS/HLH has also been associated with increased serum heme-oxygenase 1 (HO-1) (Takahashi, et al. (2009) Mod. Rheumatol., 19(3):302-8; Kirino, et al. (2005) Arthritis Res. Ther., 7(3):R616-24). It has remained unclear why this constellation of hemophagocytosis, ferritin, and HO-1 are altered in MAS/HLH.

MAS can occur secondary to a complex interplay of genetic factors, drugs, infectious agents and immunological anomalies. MAS is also closely associated with systemic juvenile idiopathic arthritis (SJIA), a disorder that has been associated with abnormal Toll-like Receptor (TLR)-induced gene expression patterns (Fall, et al. (2007) Arthritis Rheum., 56(11):3793-3804). First line therapies usually include high-dose steroids, but effective treatments remain elusive. Improved methods of treating and/or preventing MAS are needed.

SUMMARY OF THE INVENTION

In accordance with the present invention, compositions and methods for inhibiting, treating, and/or preventing macrophage activation syndrome are provided. In a particular embodiment, the method comprises administering dimethyl fumarate and/or monomethyl fumarate, or a pharmaceutically acceptable salt thereof, to a subject in need thereof.

BRIEF DESCRIPTIONS OF THE DRAWING

Figure 1B:
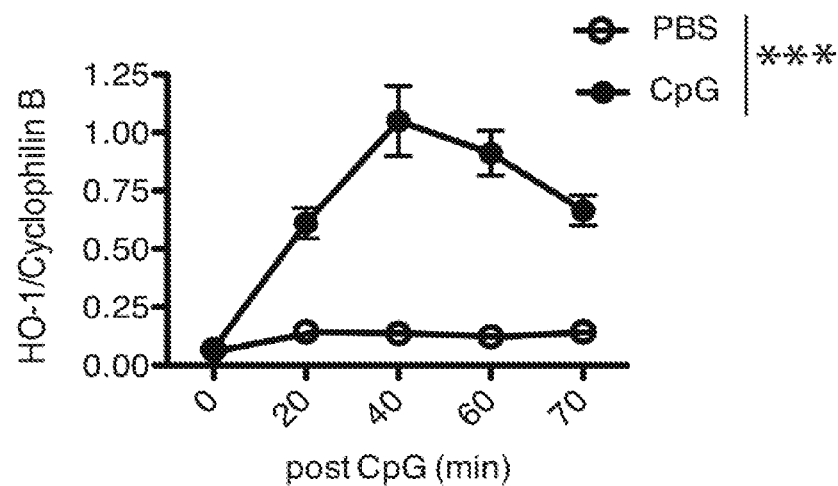
Figure 1C:
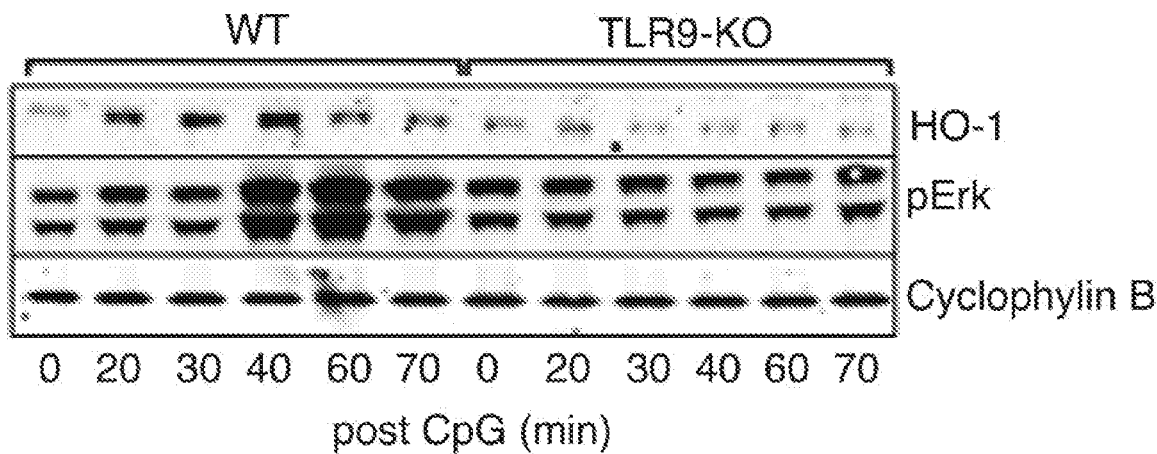
Figure 1D:
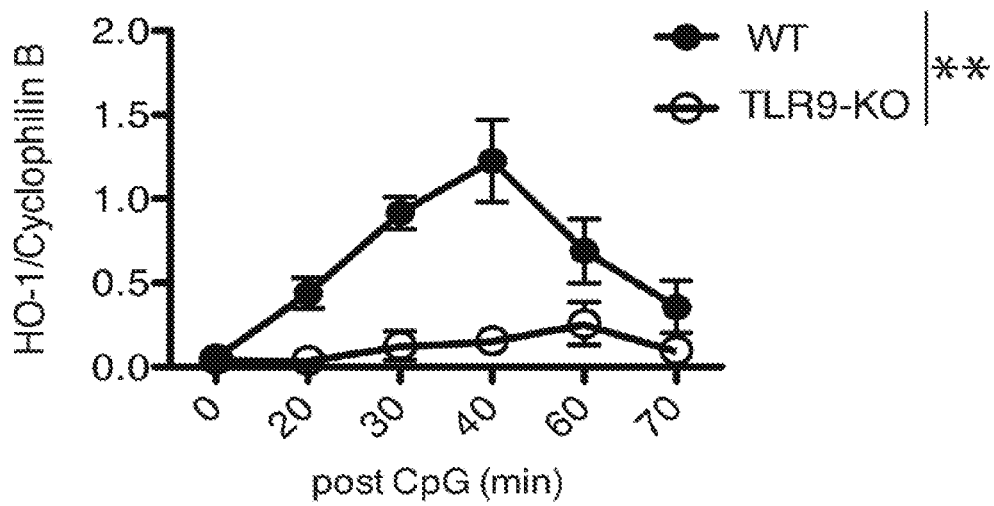
Figure 1E:
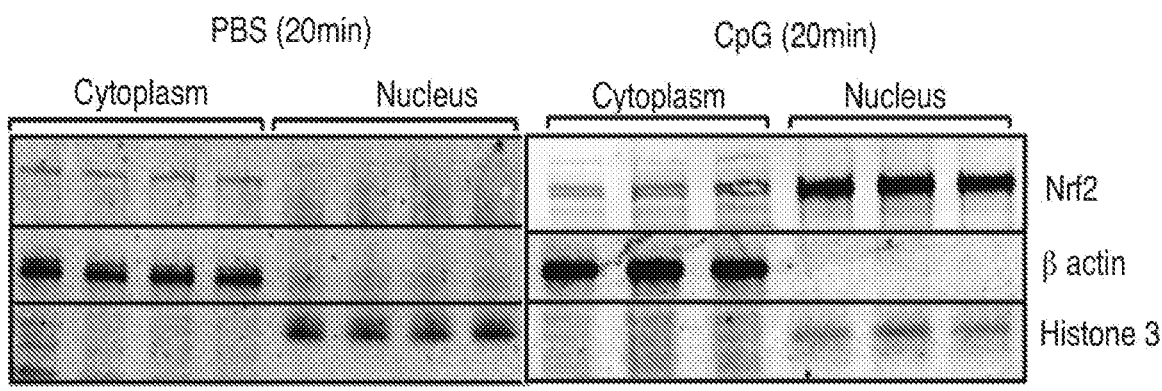
Figure 1F:
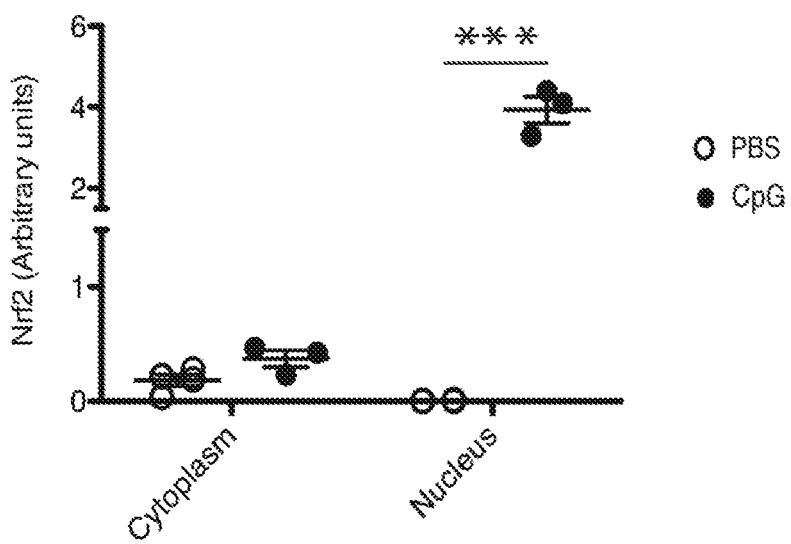

FIGS. 1A-1F show that TLR9 activation in macrophages induces HO-1 and Nrf2 protein expression. FIG. 1A: BMDMs were stimulated with CpG or PBS for indicated period of time. Whole BMDM lysates were immunoblotted for HO-1. The lower panel depicts cyclophilin B immunoblotting as the loading control. FIG. 1B: Quantitation of HO-1 band intensity normalized to cyclophilin B, averaged over 5 experiments. FIG. 1C: Time-dependent expression of HO-1 after exposure of either wild-type (WT) or Toll-like Receptor 9 (TLR9) knockout (KO) bone marrow derived dendritic cells to CpG oligodeoxynucleotide is shown. Enhanced expression of HO-1 and phosphorylation of Erk in CpG-stimulated BMDMs is dependent on TLR9. FIG. 1D: The results of FIG. 1C are quantitated as in FIG. 1B, averaged over 3 independent experiments. FIG. 1E: Immunoblotting of cytoplasmic and nuclear Nrf2 from lysates of PBS or CpG-activated BMDMs. Each lane represents a lysate from an individual experiment, for a total of 5 independent experiments. FIG. 1F: Quantitation of the blot depicted in FIG. 1E using beta tubulin or lamin B as respective normalization loading controls. FIGS. 1B and 1D analyzed by ANOVA analysis using repeated measures, p**<0.0001. In FIG. 1F, ANOVA followed by pairwise comparisons with multiple testing correction where p**<0.0001.

Figure 2A:
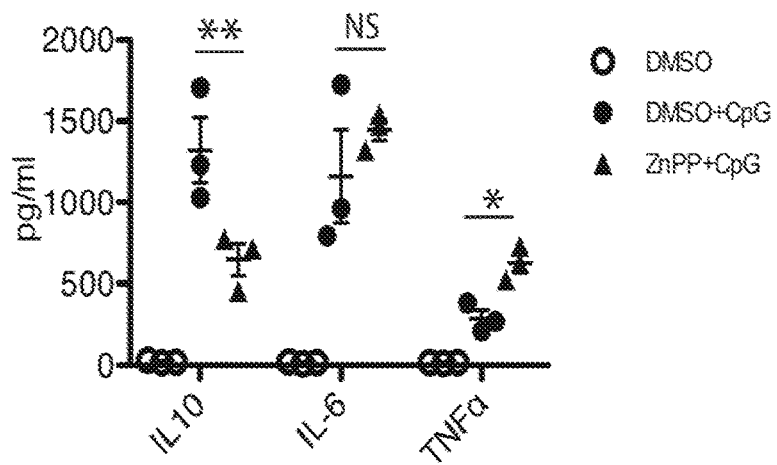
Figure 2B:
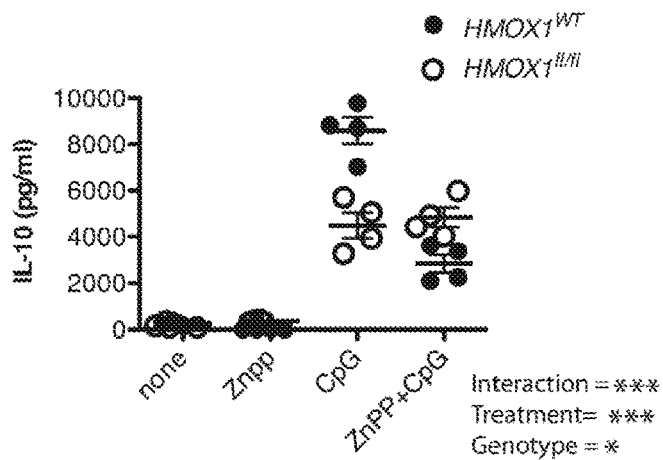
Figure 2C:
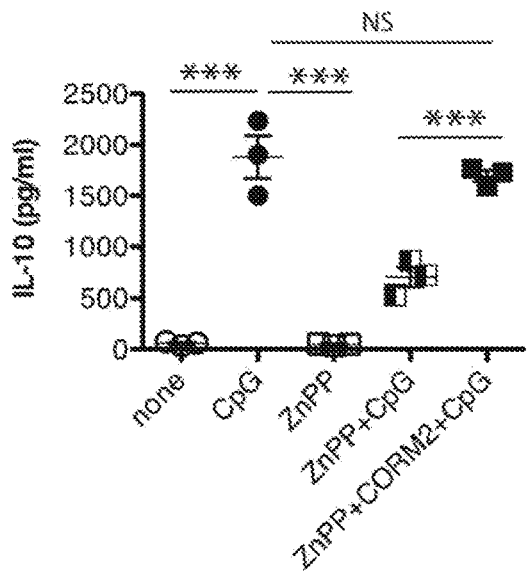
Figure 2D:
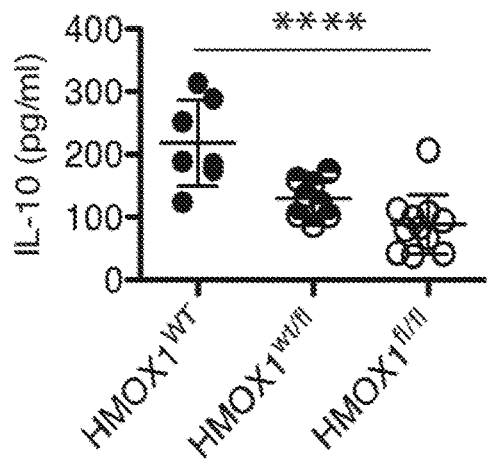
Figure 2E:
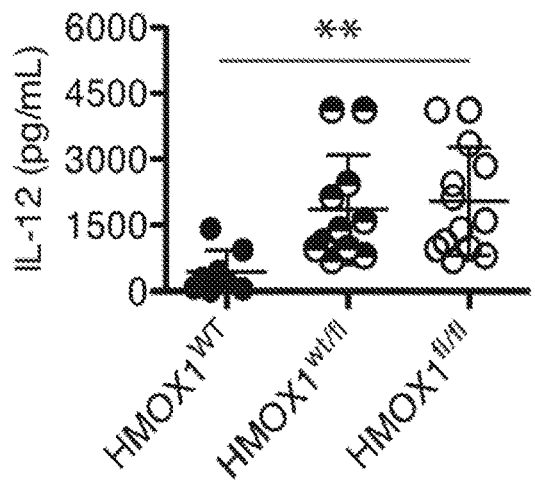
Figure 2F:
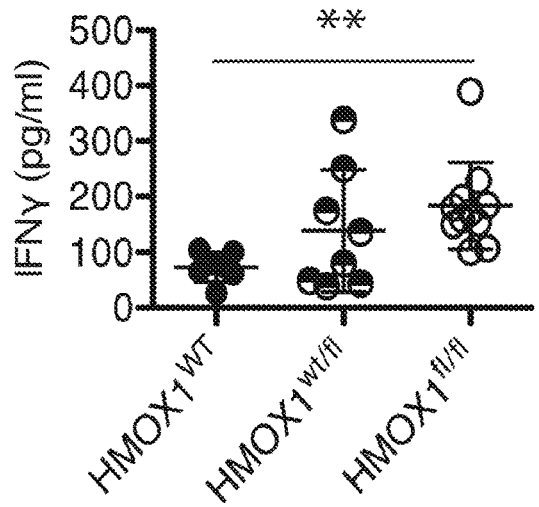
Figure 2G:
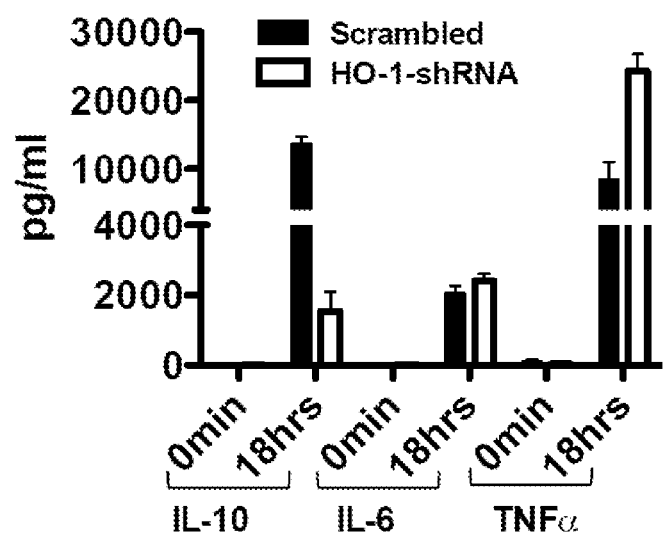

FIGS. 2A-2G show that TLR9-driven IL-10 production in macrophages is regulated by the HO-1 axis. FIG. 2A: Cytokine pattern in the supernatants of BMDMs treated with ZnPP or vehicle (dimethyl sulfoxide (DMSO)) followed by CpG (representative of 3 independent experiments). FIG. 2B: Similar to FIG. 2A, IL-10 released by the CpG-treated HMOX1$^{WT}$ and HMOX1$^{fl/fl}$ BMDMs (representative of 3 experiments). FIG. 2C: BMDMs were treated with DMSO or ZnPP as in FIG. 2A. CORM-2 was additionally added as indicated, followed by CpG (1 μg/ml of CpG) treatment and the released IL-10 measured. Data represent the combination of 3 independent experiments. FIGS. 2D-2F: HMOX1$^{WT}$, HMOX$^{wt/fl}$, and HMOX1$^{fl/fl}$ mice received repeated injections of CpG i.p. every other day for 5 doses and the serum expression of IL-10 (FIG. 2D), IL-12 (FIG. 2E), and IFNγ (FIG. 2F) were measured. Data analyzed by 1-way ANOVA followed by pair-wise comparisons with multiple testing correction where p*<0.05, p<0.01, p*<0.005. FIGS. 2D-2F analyzed by 1-way ANOVA with linear trends where p<0.01, and p**<0.0001. FIG. 2G provides a graph of the expression of IL-10, IL-6, and TNFα after exposure of macrophage to a control scrambled shRNA or an HO-1 shRNA.

Figure 3A:
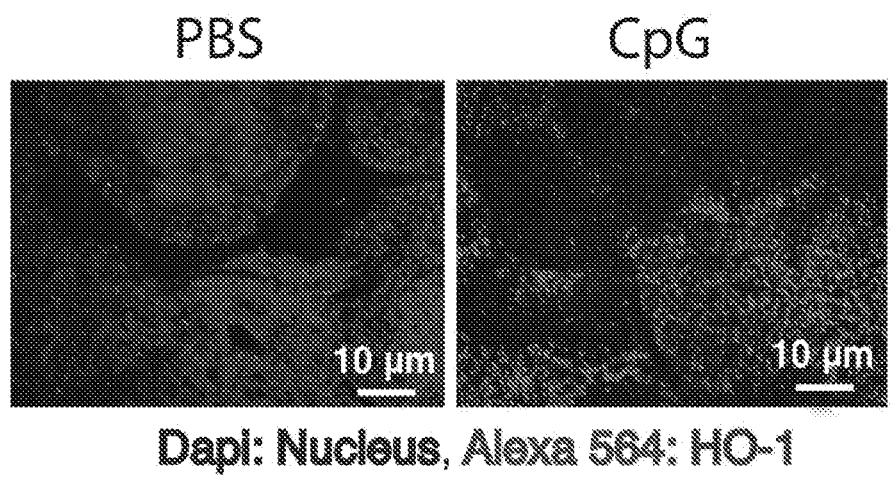
Figure 3B:
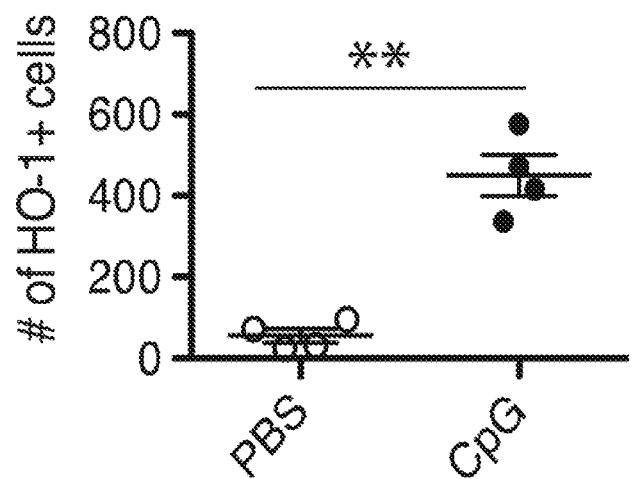
Figure 3C:
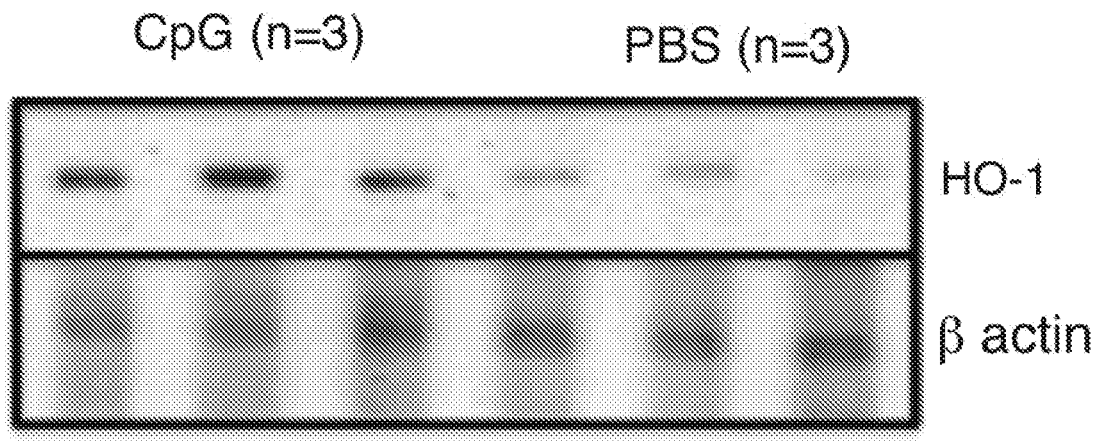
Figure 3D:
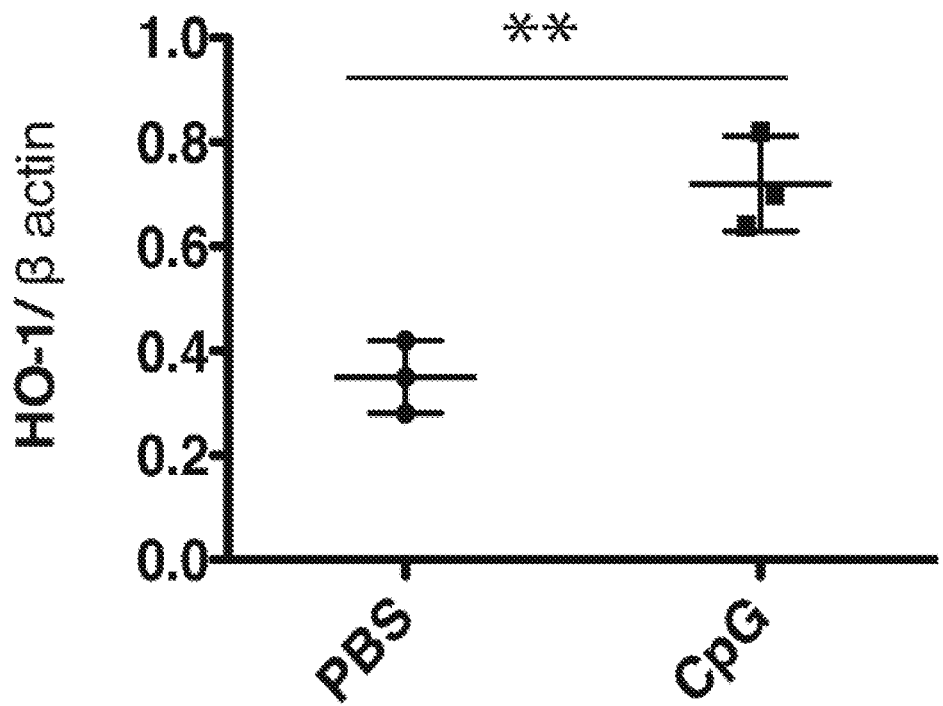
Figure 3E:
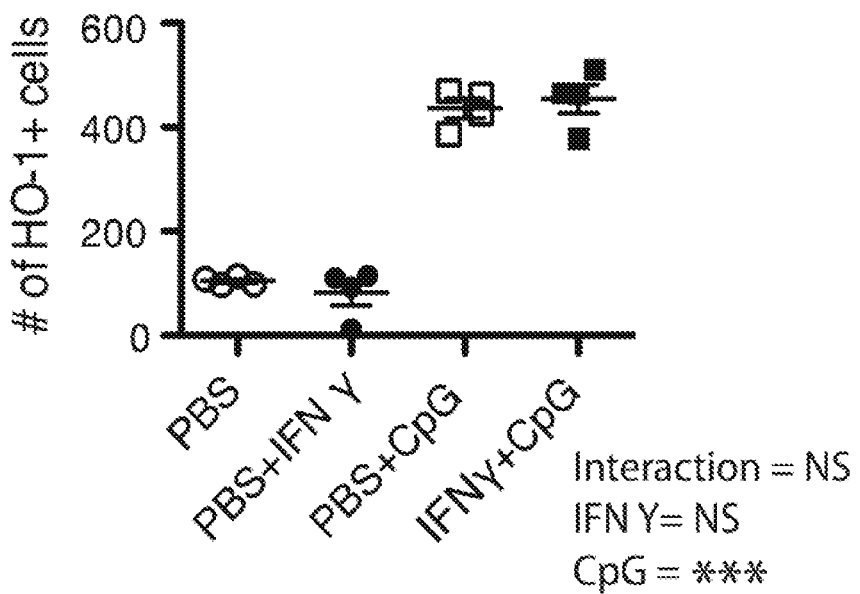

FIGS. 3A-3E show that CpG treatments increase splenic HO-1 expression in vivo. FIG. 3A: Immunohistochemistry of spleen sections from CpG-treated mice shows increased numbers of cells expressing HO-1. FIG. 3B: The HO-1 positive cells from eight different 20× fields per 20× high-powered field (from A) are quantitated from each mouse, and then the sum of these eight fields plotted and each dot represents one mouse. FIG. 3C: HO-1 levels were assessed by western blot of the homogenates of single lymphocyte suspension from individual mouse spleens. FIG. 3D: A graph of the data quantitated for 3 experimental repeats of FIG. 3C. FIG. 3E: Spleens from IFNγ-KO mice treated with PBS, CpG, IFNγ, or CpG and IFNγ were assessed for HO-1 expression by immunohistochemistry. Cells per 60× high-powered field were quantified (representative of 4 experiments). Quantitative cell counts per 60× high powered field is shown, each dot represents one mouse. FIGS. 3B, 3C, and 3D analyzed by Student's unpaired 2-tailed t-test, p<0.01; *p<0.005. FIG. 3E analyzed by two-way ANOVA. NS=not significant.

Figure 4A:
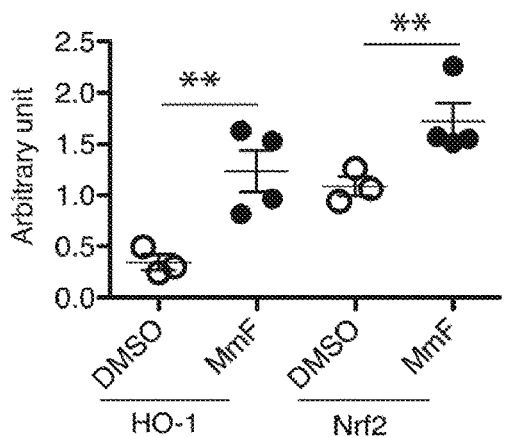
Figure 4B:
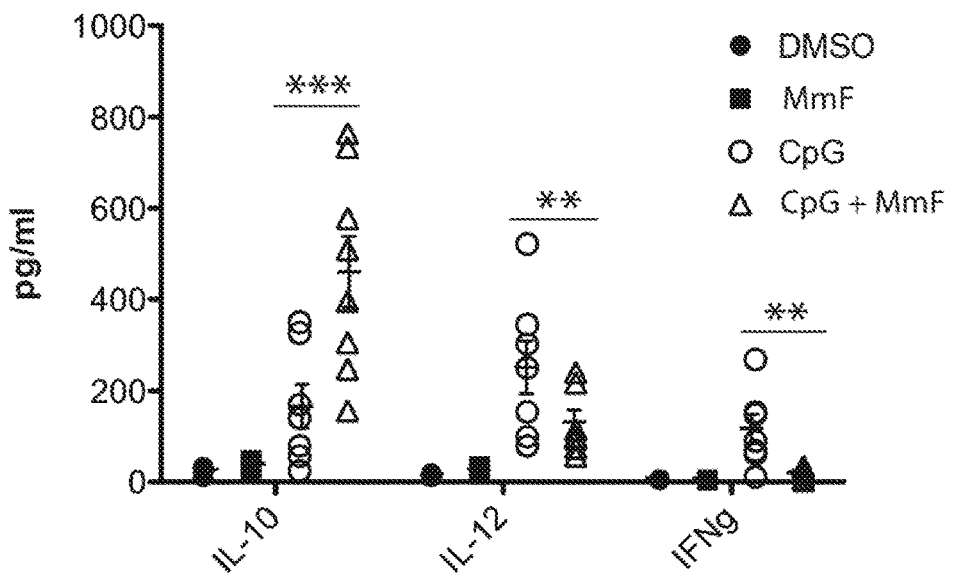
Figure 4C:
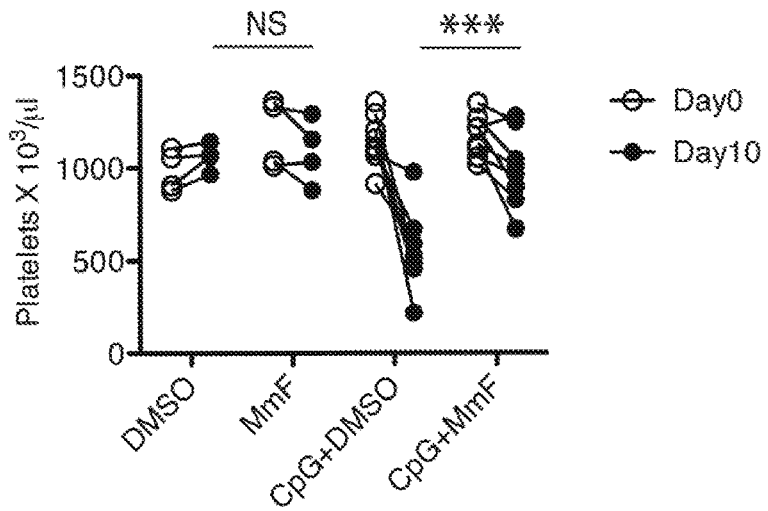
Figure 4D:
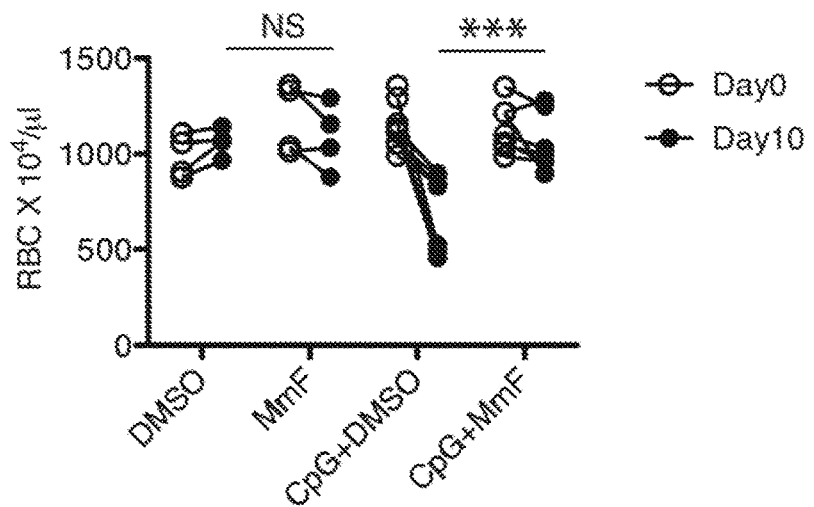
Figure 4E:
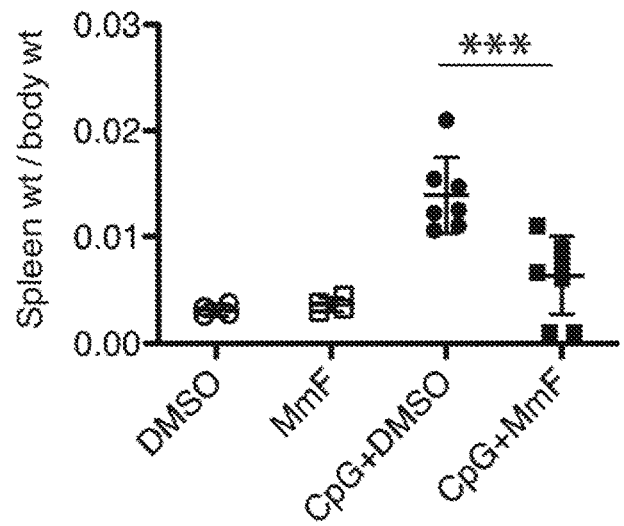
Figure 4F:
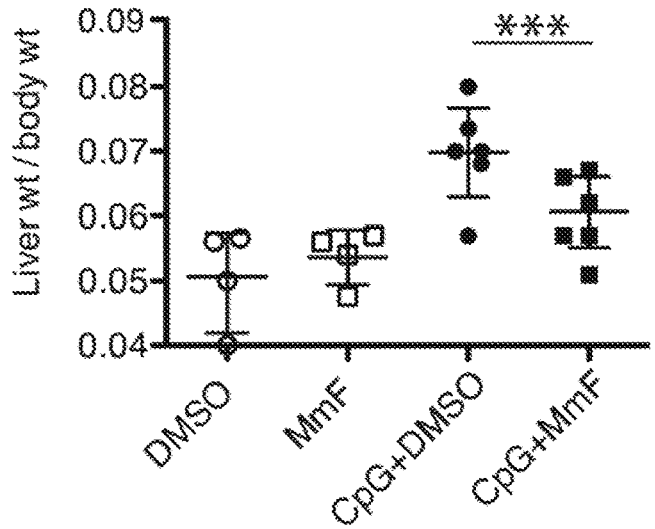

FIGS. 4A-4F show that MMF activates the Nrf2/HO-1 axis and ameliorates TLR9-driven MAS. Mice were injected with MMF or DMSO twice a day, with the final dose approximately 4 hours prior to euthanasia. Single cell suspensions were prepared from harvested spleen and seeded on plastic tissue culture dishes. After 2 hours, the adherent macrophages were collected and lysed, and Nrf2 and HO-1 expression levels were assessed by Western blot. FIG. 4A: The quantitative expression of Nrf2 and HO-1 were normalized to respective loading controls. FIG. 4B: CpG or PBS-treated mice received MMF or DMSO twice per day. Serum IL-10, IL-12, and IFNγ, were measured by ELISA. FIGS. 4C-4D: Red blood cell count (RBC; FIG. 4C) and platelet count (FIG. 4D) prior to first CpG dose (day 0) and 24 hours after the last dose (day 10) measured in mice treated as in FIG. 4B. Spleen weights to body weight ratio (FIG. 4E) and liver weight (FIG. 4F) are also presented. In FIGS. 4A-4F, p value represents Students' unpaired t-test. In FIGS. 4C and 4D, p value represents results testing the interaction term of a 2-way ANOVA on day 10 values, $p^*<0.05$, $p^{}<0.01$, $p^{*}<0.005$.

FIGS. 5A-5F show that MMF treats disease manifestations of TLR9-MAS. $HMOX1^{wt}$ and $HMOX1^{fl/fl}$ mice were treated with 5 doses of CpG to induce MAS and MMF or DMSO was additionally administered twice daily. Mice were euthanized on day 10 for assessment of MAS disease activity parameters. Serum measurements of IL-10 (FIG. 5A) and IL-12 (FIG. 5B) were determined by ELISA. RBCs (FIG. 5C) and platelet counts (FIG. 5D) were determined by complete blood counts. Two-way ANOVA was used to test for significant interaction between MMF treatment and genotype. Likewise, spleen weight (FIG. 5E) and liver weight (FIG. 5F) were measured and two-way ANOVA used to test for an interaction between MMF and genotype. $p^*<0.05$, $p^{}<0.01$, $p^{*}<0.005$.

Figure 6A:
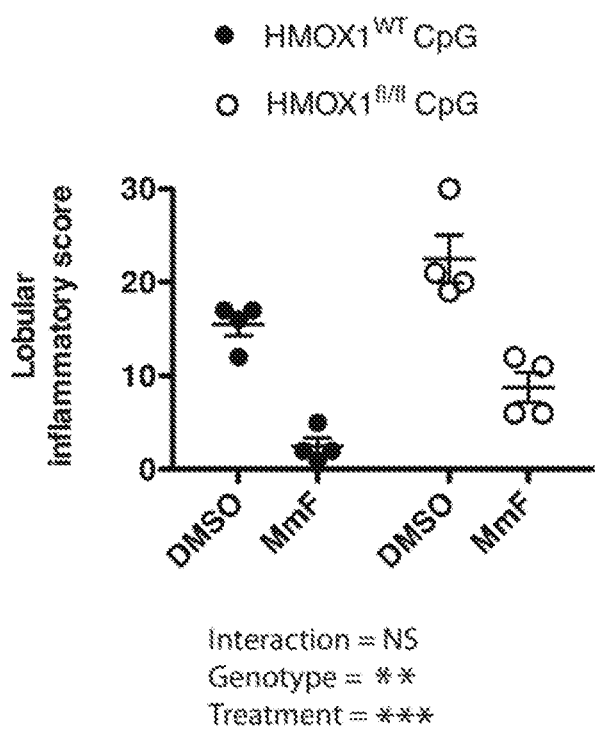
Figure 6B:
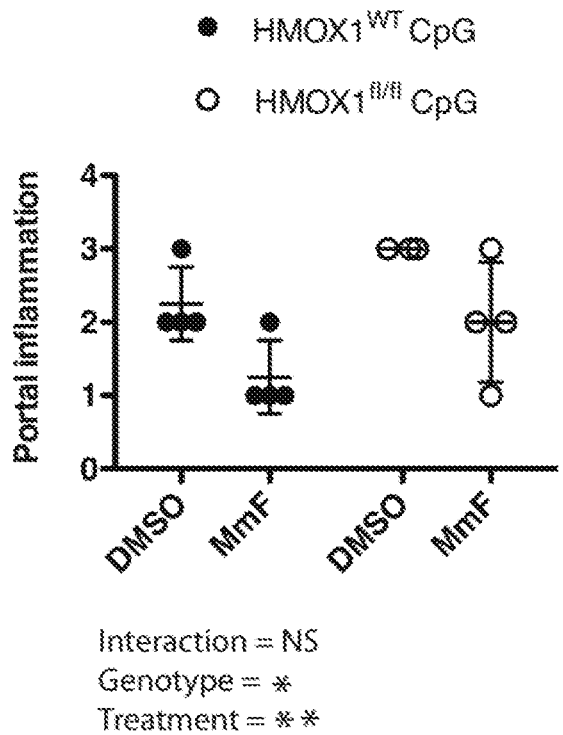
Figure 6C:
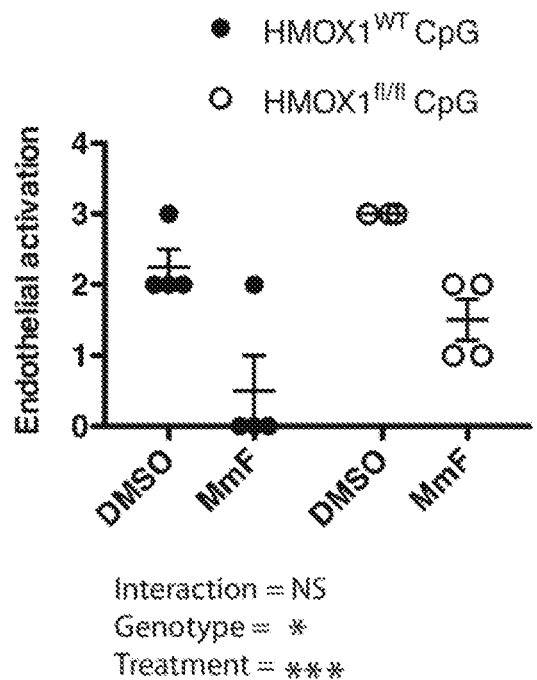

FIGS. 6A-6C show that MMF improves hepatic inflammation in an HO-1 independent manner. Representative hematoxylin and eosin stained sections from livers from animals with TLR9-MAS with the indicated genotypes and treatments were assessed by a blinded pathologist and scored for various features. FIG. 6A: Lobular inflammatory score as measured by number of inflammatory foci per 100× field in the most involved area. FIG. 6B: Portal inflammatory score as measured on a scale of 0-4 with 0 being absent and 4 representing severe inflammation. FIG. 6C: Histologic endothelial activation as measured by morphologic changes in the vascular endothelial cells was 0-4 with 0 being normal and 4 representing severe changes of rounding of cells, plumpness of cytoplasm and enlargement of nuclei. 2 way-ANOVA was performed to check for significant differences between genotypes, treatment effects, and interactions, $p^*<0.05$, $p^{**}<0.01$.

DETAILED DESCRIPTION OF THE INVENTION

In the case of bacterial sepsis and infectious cytokine storm syndrome, hemophagocytes are a major contributor to HO-1 levels (Schaer, et al. (2006) Eur. J. Haematol., 77(5): 432-6). Furthermore, in murine models of HLH, the hemophagocytic compartment produces copious amounts of protective anti-inflammatory IL-10 (Ohyagi, et al. (2013) Immunity 39(3):584-98). HO-1 has also been implicated in certain anti-inflammatory pathways. For example, HO-1 can mediate the anti-inflammatory effect of interleukin-10 (IL-10) in mice and HO-1 can mediate certain anti-inflammatory effects by IL-10 induction in monocytes (Lee et al. (2002) Nat. Med., 8(3):240-6; Drechsler et al. (2006) J. Immunol., 177(4):2592-600). However, the mechanism by which HO-1 and IL-10 interact in MAS was unknown. Herein, it is demonstrated that MMF ameliorates MAS in a murine a model of the disease.

IL-10 is one of the best-known anti-inflammatory cytokines and has both autocrine and paracrine effects in inhibiting proinflammatory responses and thus in shaping innate and adaptive immune cells (Bogdan, et al. (1991) J. Exp. Med., 174(6):1549-55; Ng, et al. (2013) Front. Immunol., 4:129). IL-10 has a role in limiting the pathology of a murine model of MAS, which relies on repeated stimulation of Toll-like Receptor 9 (TLR9) (Behrens, et al. (2011) J. Clin. Invest., 121(6):2264-77; Weaver, et al. (2019) Arthritis Rheumatol., 71(1):161-8). This TLR9-MAS model recapitulates many of the features of MAS. The model has been used to predict interferon gamma (IFNγ) blockade as an important therapeutic approach and CXCL9 as a marker of disease activity (Behrens, et al. (2011) J. Clin. Invest., 121(6):2264-77; Bracaglia, et al. (2017) Ann. Rheum. Dis., 76(1):166-72). Both of these murine observations have been successfully translated in human clinical use for MAS. Additionally, the TLR9-MAS model has been shown to be influenced by IL-18, reminiscent of MAS in the context of Systemic Juvenile Idiopathic Arthritis (Girard-Guyonvarc'h, et al. (2018) Blood 131(13):1430-41).

HO-1, encoded by the gene HMOX1, is evolutionarily conserved across the phylogeny (Kikuchi, et al. (2005) Biochem. Biophys. Res. Commun., 338(1):558-67; Loboda, et al. (2016) CMLS 73(17):3221-47) and is better understood for its canonical function in the degradation of heme into free iron (Fe2+), carbon monoxide (CO) and a transient product, biliverdin, which is rapidly converted to bilirubin (Tenhunen, et al. (1969) J. Biol. Chem., 244(23):6388-94). Typically, HO-1 transcription is regulated by nuclear factor erythroid 2-related factor 2 (Nrf2), which upon activation escapes proteasomal degradation and translocates to the nucleus (Sun, et al. (2004) Proc. Natl. Acad. Sci., 101(6): 1461-6). Simultaneously in the nucleus, heme replaces Bach1, a suppressor of HO-1, and allows Nrf2 in a complex with musculoaponeurotic fibrosarcoma (Maf) protein to bind to the anti-oxidant response element (Cuadrado, et al. (2018) Pharmacol. Rev., 70(2):348-83; Mohan, et al. (2018) Biomed. Pharmacother., 108:1866-78) of HO-1 facilitating promoter activation and its transcription (Davudian, et al. (2016) Gene 588(1):30-7). Like Nrf2, HO-1 is also induced by many stressors including inflammation (Abraham, et al. (2008) Pharmacol. Rev., 60(1):79-127).

One of the products of the HO-1 enzymatic reaction on heme is free Fe2+. When in excess, Fe2+ is sequestered by the iron binding molecule ferritin to prevent toxicity from highly reactive Fe2+ and also as a store for iron pool to be reused when required (Rohrer, et al. (1987) J. Biol. Chem., 262(28):13385-7). However, HO-1 also has potential as an anti-inflammatory molecule, particularly in context with other reaction products, CO and bilirubin, although the underlying mechanisms are not well understood (Uddin, et al. (2015) Mediat. Inflamm., 2015:613249; Bock, et al. (2010) Biol. Chem., 391(6):645-53; Sheikh, et al. (2011) J. Immunol., 186(9):5506-13). Increasing HO-1 activity, through Nrf2 or other regulators, therefore can be a regulator of immune activity during systemic inflammatory processes.

Given its role in both regulating inflammation and oxidative stress, the Nrf2/HO-1 axis has been targeted pharmacologically with the compound dimethyl fumarate

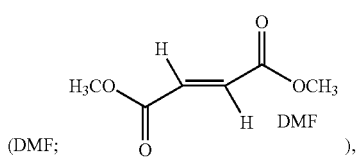
(DMF), an FDA approved medication for relapsing remitting multiple sclerosis (Gold, et al. (2017) Mult. Scler., 23(2):253-65). DMF is rapidly converted into monomethyl fumarate

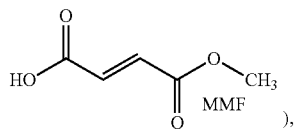
(MMF), the biologically active compound (Cho, et al. (2015) J. Neuroinflammation 12:239). MMF in turn increases Nrf2 activity to potentiate its downstream targets including HO-1 (Singh, et al. (2019) Neurochem. Int., 126:96-108).

Herein, the loss of HO-1 function through multiple means is shown to significantly suppresses TLR9 induced IL-10 production in vitro and in vivo using myeloid-specific HMOX1 gene ablated mice. This loss of function does not make disease significantly worse, likely due to redundant sources of IL-10. However, induced gain-of-function of this axis using the Nrf2/HO-1 inducing drug MMF ameliorates the features of TLR9-MAS in both an HO-1-dependent and—independent manner.

The instant invention encompasses methods of inhibiting, treating, and/or preventing macrophage activation syndrome in a subject in need thereof. The methods of the instant invention may further comprise diagnosing macrophage activation syndrome in the subject prior to administration of the therapy and/or monitoring macrophage activation syndrome in the subject prior to, during, and/or after administration of the therapy. The methods of the instant invention can be co-administered (sequentially and/or simultaneously) with at least one other therapeutic for the treatment of macrophage activation syndrome. For example, current therapeutic modalities for macrophage activation syndrome include, without limitation, corticosteroids, glucocorticoids, cyclosporine A, and interferon gamma (IFN-γ) inhibitors (e.g., anti-IFN-γ antibodies (e.g., emapalumab)).

While the instant invention focuses on the inhibition, treatment, and/or prevention of macrophage activation syndrome, the instant invention also encompasses methods of inhibiting, treating, and/or preventing other diseases or disorders associated with modulated (e.g., increased) HO-1. Examples of other diseases or disorders that can be treated with the methods of the instant invention include, without limitation, hemophagocytic lymphohistiocytosis (HLH) and adult-onset Still's disease (ASD). In a particular embodiment, the other disease or disorder is HLH. HLH (also known as hemophagocytic syndrome) comprises familial (primary) hemophagocytic lymphohistiocytosis (FHL or FHLH) and secondary HLH (SHLH). HLH is a hematologic disorder that is typically characterized with fever, splenomegaly, cytopenia, elevated ferritin, elevated triglycerides or decreased fibrinogen, hemophagocytosis, low NK cell activity, and/or elevated soluble IL-2 receptor. The presence of at least about five of these symptoms is typically required for diagnosis. HLH may also be characterized by other symptoms such as liver function test abnormalities, jaundice, rash, coagulopathy, lymphocytosis, and/or histiocytosis. HLH may also be screened for through detection of at least one biomarker such as, without limitation: ferritin, soluble IL-2 receptor, IFNγ, complete blood count, fibrinogen, erythrocyte sedimentation rate (ESR), and/or C-reactive protein (CRP). HLH may be monitored by measuring at least one of the above biomarkers or symptoms and/or monitoring at least one of blood pressure, liver function, renal function, fever, rash, and splenomegaly.

In a particular embodiment, the methods of the instant invention comprise administering monomethyl fumarate or a pharmaceutically acceptable salt thereof and/or dimethyl fumarate or a pharmaceutically acceptable salt thereof to a subject.

In a particular embodiment, the methods of the instant invention comprise administering an alkyl or di-alkyl ester (e.g., a C1-C3 alkyl) of fumarate (e.g., a methyl or dimethyl ester of fumarate) or a pharmaceutically acceptable salt thereof to a subject. In a particular embodiment, the methods of the instant invention comprise administering monomethyl fumarate or a pharmaceutically acceptable salt thereof to the subject. The methods of the instant invention also encompass the administration of prodrugs (e.g., aminoalkyl prodrugs) or analogs of monomethyl fumarate and/or dimethyl fumarate. Examples of prodrugs of monomethyl fumarate are provided in U.S. Patent Application Publication Nos. 20190167638 (e.g., a compound of Formula (I), (Ia), (Ib), (II), or (III)), 20190256481 (e.g., a compound of Formula (I)), 20160214948 (e.g., a compound of Formula (I), (Ia), (II), or (IIa)), and 20130216615 (e.g., a compound of Formula (I), (II), (III), (IV), (V), or (VI)) and U.S. Pat. No. 8,669,281 (e.g., a compound of Formula (I)) (each of which incorporated by reference herein).

Compositions comprising a compound of the instant invention such as monomethyl fumarate or a pharmaceutically acceptable salt thereof and/or dimethyl fumarate or a pharmaceutically acceptable salt thereof are also encompassed by the instant invention. In a particular embodiment, the composition further comprises a pharmaceutically acceptable carrier. The compositions may also comprise at least one other therapeutic as described hereinabove.

The therapeutic agents of the instant invention (or composition(s) comprising the same) can be administered by any suitable route, for example, by injection (e.g., for local, direct, or systemic administration), oral, pulmonary, topical, nasal or other modes of administration. The composition may be administered by any suitable means, including parenteral, intramuscular, intravenous, intravascular, intraarterial, intraperitoneal, subcutaneous, topical, inhalatory, transdermal, intrapulmonary, intraareterial, intrarectal, intramuscular, and intranasal administration. In a particular embodiment, the composition is administered intraperitoneally. In general, the pharmaceutically acceptable carrier of the composition is selected from the group of diluents, preservatives, solubilizers, emulsifiers, adjuvants and/or carriers. The compositions can include diluents of various buffer content (e.g., Tris HCl, acetate, phosphate), pH and ionic strength; and additives such as detergents and solubilizing agents (e.g., polysorbate 80), anti oxidants (e.g., ascorbic acid, sodium metabisulfite), preservatives (e.g., Thimersol, benzyl alcohol) and bulking substances (e.g., lactose, mannitol). The compositions can also be incorporated into particulate preparations of polymeric compounds such as polyesters, polyamino acids, hydrogels, polylactide/glycolide copolymers, ethylenevinylacetate copolymers, polylactic acid, polyglycolic acid, etc., or into liposomes.

Such compositions may influence the physical state, stability, rate of in vivo release, and rate of in vivo clearance of components of a pharmaceutical composition of the present invention (see, e.g., Remington's Pharmaceutical Sciences and Remington: The Science and Practice of Pharmacy). The pharmaceutical composition of the present invention can be prepared, for example, in liquid form, or can be in dried powder form (e.g., lyophilized for later reconstitution).

The therapeutic agents described herein will generally be administered to a patient as a pharmaceutical preparation. The term "patient" as used herein refers to human or animal subjects. The compositions of the instant invention may be employed therapeutically or prophylactically, under the guidance of a physician.

The compositions comprising the agent of the instant invention may be conveniently formulated for administration with any pharmaceutically acceptable carrier(s). The concentration of agent in the chosen medium may be varied and the medium may be chosen based on the desired route of administration of the pharmaceutical preparation. Except insofar as any conventional media or agent is incompatible with the agent to be administered, its use in the pharmaceutical preparation is contemplated.

The dose and dosage regimen of the agent according to the invention that is suitable for administration to a particular patient may be determined by a physician considering the patient's age, sex, weight, general medical condition, and the specific condition for which the agent is being administered to be treated or prevented and the severity thereof. The physician may also take into account the route of administration, the pharmaceutical carrier, and the agent's biological activity. Selection of a suitable pharmaceutical preparation will also depend upon the mode of administration chosen.

A pharmaceutical preparation of the invention may be formulated in dosage unit form for ease of administration and uniformity of dosage. Dosage unit form, as used herein, refers to a physically discrete unit of the pharmaceutical preparation appropriate for the patient undergoing treatment or prevention therapy. Each dosage should contain a quantity of active ingredient calculated to produce the desired effect in association with the selected pharmaceutical carrier. Procedures for determining the appropriate dosage unit are well known to those skilled in the art.

Dosage units may be proportionately increased or decreased based on the weight of the patient. Appropriate concentrations for alleviation or prevention of a particular condition may be determined by dosage concentration curve calculations, as known in the art.

The pharmaceutical preparation comprising the agent may be administered at appropriate intervals until the pathological symptoms are reduced or alleviated, after which the dosage may be reduced to a maintenance level. The appropriate interval in a particular case would normally depend on the condition of the patient. Toxicity and efficacy (e.g., therapeutic, preventative) of the particular formulas described herein can be determined by standard pharmaceutical procedures such as, without limitation, in vitro, in cell cultures, ex vivo, or on experimental animals. The data obtained from these studies can be used in formulating a range of dosage for use in human. The dosage may vary depending upon form and route of administration. Dosage amount and interval may be adjusted individually to levels of the active ingredient which are sufficient to deliver a therapeutically or prophylactically effective amount.

Definitions

The following definitions are provided to facilitate an understanding of the present invention:

The singular forms "a," "an," and "the" include plural referents unless the context clearly dictates otherwise.

As used herein, the terms "host," "subject," and "patient" refer to any animal, particularly mammals including humans.

"Pharmaceutically acceptable" indicates approval by a regulatory agency of the Federal or a state government or listed in the U.S. Pharmacopeia or other generally recognized pharmacopeia for use in animals, and more particularly in humans.

A "carrier" refers to, for example, a diluent, adjuvant, preservative (e.g., Thimersol, benzyl alcohol), anti-oxidant (e.g., ascorbic acid, sodium metabisulfite), solubilizer (e.g., polysorbate 80), emulsifier, buffer (e.g., Tris HC1, acetate, phosphate), antimicrobial, bulking substance (e.g., lactose, mannitol), excipient, auxiliary agent or vehicle with which an active agent of the present invention is administered. Pharmaceutically acceptable carriers can be sterile liquids, such as water and oils, including those of petroleum, animal, vegetable or synthetic origin. Water or aqueous saline solutions and aqueous dextrose and glycerol solutions may be employed as carriers, particularly for injectable solutions. Suitable pharmaceutical carriers are described in "Remington's Pharmaceutical Sciences" by E.W. Martin (Mack Publishing Co., Easton, PA); Gennaro, A. R., Remington: The Science and Practice of Pharmacy, (Lippincott, Williams and Wilkins); Liberman, et al., Eds., Pharmaceutical Dosage Forms, Marcel Decker, New York, N.Y.; and Kibbe, et al., Eds., Handbook of Pharmaceutical Excipients, American Pharmaceutical Association, Washington.

The term "treat" as used herein refers to any type of treatment that imparts a benefit to a patient afflicted with a disease, including improvement in the condition of the patient (e.g., in one or more symptoms), delay in the progression of the condition, etc.

As used herein, the term "prevent" refers to the prophylactic treatment of a subject who is at risk of developing a condition (e.g., macrophage activation syndrome) resulting in a decrease in the probability that the subject will develop the condition.

A "therapeutically effective amount" of a compound or a pharmaceutical composition refers to an amount effective to prevent, inhibit, or treat a particular disorder or disease and/or the symptoms thereof. For example, "therapeutically effective amount" may refer to an amount sufficient to modulate macrophage activation syndrome in a subject.

As used herein, the term "subject" refers to an animal, particularly a mammal, particularly a human.

An "antibody" or "antibody molecule" is any immunoglobulin, including antibodies and fragments thereof, that binds to a specific antigen. As used herein, antibody or antibody molecule contemplates intact immunoglobulin molecules, immunologically active portions of an immunoglobulin molecule, and fusions of immunologically active portions of an immunoglobulin molecule.

As used herein, the term "immunologically specific" refers to proteins/polypeptides, particularly antibodies, that bind to one or more epitopes of a protein or compound of interest, but which do not substantially recognize and bind other molecules in a sample containing a mixed population of antigenic biological molecules.

As used herein, a "prodrug" refers to an agent that is converted into the parent drug in vivo.

The following example provides illustrative methods of practicing the instant invention and is not intended to limit the scope of the invention in any way.

EXAMPLE

Materials and Methods

Mice

C57BL/6 (WT) and LysM-Cre mice were purchased from The Jackson Laboratory (Bar Harbor, ME). HMOX1$^{fl/fl}$ mice were crossbred with LysM-Cre mice and genotyped regularly to obtain mice with deletion of the HO-1 gene in myeloid lineage and are designated as: HMOX1$^{WT}$ (intact HO-1), HMOX1$^{WT/fl}$ (x LysM-cre, HO-1-haplodeficient,), and HMOX1$^{fl/fl}$ (x LysM-Cre, complete HO-1-deficiency).

Macrophages and TLR9 Activation

Bone marrow (BM) was extracted from the hind limbs of mice and filtered over a 70-μm strainer to obtain a single cell suspension, followed by RBC lysis. Bone marrow derived macrophages (BMDM) were derived by culture in M-CSF-enriched media of L929 cells. RAW264.7 cells were obtained from ATCC (Manassas, VA). Class B CpG1826 oligonucleotide was synthesized by Integrated DNA Technologies (Coralville, IA). Macrophages were treated with CpG (1 μg/ml) for 18 to 20 hours for cytokine analysis in cell supernatant, and for 0 to 2 hours for analysis of protein expression level by Western blot treated as indicated.

Stable Knockdown of HO-1 with shRNA

The knockdown was carried out as described (Biswas, et al. (2014) J. Biol. Chem., 289(39):26882-94). Briefly, based on the highest knockdown efficiency, clone 6 (71758) was used to knockdown HO-1 and clone 11, which has no effect on HO-1 expression, was used as control (nonspecific or scrambled shRNA).

Induction and Assessment of MAS in Mice

MAS was induced by repeated activation of TLR9 as described (Behrens, et al. (2011) J. Clin. Invest., 121(6): 2264-77; Weaver, et al. (2016) Proc. Natl. Acad. Sci., 113(39):10944-9). Briefly, 8-week old mice were injected with five doses of PBS or 50 μg of CpG1826 intraperitoneally every other day for 9 days, while MMF (cat no: 4511, TOCRIS (Bristol, UK)) in DMSO was injected at 45 mg/Kg body weight based on standard dosing used in other murine studies (Cho, et al. (2015) J. Neuroinflammation 12:239; Yao, et al. (2016) Transl. Stroke Res., 7(6):535-47), every day once in the morning and once in the evening. The control group received DMSO instead of MMF. On day-10 mice were euthanized 24 hours after the last MMF injection, bled terminally to collect blood for complete blood count (CBC) and differential count, and serum for cytokine analysis by ELISA. Spleens and livers were harvested and were formalin fixed followed by paraffin embedment for tissue sectioning and slide preparation for histology and immunohistochemistry (IHC). To obtain single suspension of spleen leukocytes, spleens at 37° C. were disrupted and incubated in the presence of DNAase and collagenase, followed by filtering over 70-μm strainers and RBC lysis. The cells were counted and then adhered for 2 hours on petri dishes to obtain plastic adherent macrophages.

Histology and Immunohistochemistry

Slides from paraffin-embedded tissue sections were stained with hematoxylin and eosin or were immune-stained for HO-1 (cat no. ADI-SPA-896, Enzo), followed by nuclear stain using prolong gold antifade reagent with Dapi (P36931, Invitrogen (Carlsbad, CA)). Images were acquired on an Eclipse 90i microscope (Nikon (Melville, NY)) using NIS-ELEMENTS software.

Cytokine Analysis

TLR9 activation induced cytokines from cells supernatants and serum were measured by using the ELISA kits from BD OptEIA™ (Cat nos. IL-12: 555256, IL-10: 555252, TNFα: 555268 and IL-6: 555240; Franklin Lakes, NJ).

Preparation of Protein Lysates

Cells were harvested in the presence of a cocktail of protease and phosphatase inhibitors (Cat no. 1861281, HALT) and were either homogenized in M-PER mammalian protein extraction buffer (Cat no. 78501, Thermo Scientific (Waltham, MA)) or fractionated into cytoplasmic and nuclear fractions using NE-PER nuclear and cytoplasmic extraction reagent (Cat no. 78833, Thermo Scientific). The protein content in the lysates was measured by a 96-well plate-based Bradford assay (Cat no. 5000006, Biorad protein assay reagent concentrate).

Western Blot

Protein samples (10-12 μg) were resolved by SDS-PAGE on 4-12% Bis-Tris gels (Invitrogen), electrotransferred to nitrocellulose membranes (Cat no. 10484060, Bio-Rad (Hercules, CA)), and assessed for the immunosignal of proteins using the antibodies against HO-1 (cat no. ADI-SPA-896, Enzo (Farmingdale, NY)), Nrf2 (Cat no. 12721, Cell Signaling (Danvers, MA)), Erk (Cat no. 4695, Cell signaling), pErk (Cat no. 4379, Cell Signaling), Cyclophilin B (CyPB, Cat no. PA1-027A, ThermoFisher Scientific), β tubulin (Cat no. 2146, Cell Signaling), β actin (Cat No. 66009-1-Ig, Proteintech (Rosemont, IL)), Calnexin (Cat no. ab22595, abcam (Cambridge, UK) and Histone 3 (Cat no. 4499, Cell Signaling). Fluorescence tagged respective secondary antibodies obtained from Li-COR (Lincoln, Neb.)—Goat-anti-Rabbit-antibody (IRDye® 800CW), or Donkey-anti-mouse-antibody (IRDye® 800CW) or Donkey anti-Mouse IgG (IRDye® 680RD) were then used. Densitometric digital assessments were documented using the Odyssey® (make 9120, LI-COR). The signals were plotted as bar graphs or scatter plots after normalizing against the respective loading controls.

Statistical Analyses

All values are shown as means. Error bars represent SEMs. Paired one- or two-tailed t tests, one-way or two-way ANOVA were performed using GraphPad Prism version 7.00 (GraphPad Software) to assess statistical significance depending on the structure of the data being analyzed: P*<0.05; P<0.01; P *, <0.005; and, P****<0.0001.

Results

TLR9 Activation in Macrophages Induces HO-1 Expression

To determine if endogenous TLR9-driven IL-10 production is regulated by HO-1, it was first tested whether HO-1 expression is altered by TLR9 activation by a Class B CpG1826 oligonucleotide. An induction of HO-1 protein expression was observed in CpG-treated BMDM within 20 minutes, maximally within 40 to 60 minutes followed by a gradual decline by 70 minutes (FIG. 1A). This induction was robustly reproducible (FIG. 1B, average of 5 repeats), and the HO-1 induction is specific to TLR9 activation as the signal was absent in CpG-treated TLR9-KO BMDMs (FIGS. 1C-1D).

TLR9-Driven HO-1 Induction was Associated with Nrf2 Activation

Nuclear factor erythroid 2-related factor 2 (Nrf2) is a basic leucine zipper (bZIP) transcription factor and is an upstream transcription factor for HO-1 (Yu et al. (2016) PLoS One 11(3):e0152236). Thus, TLR9-induced nuclear localization of Nrf2 was also assessed. In CpG activated BMDMs, nuclear localization of Nrf2 was observed (FIGS. 1E and 1F) within 20 minutes of CpG activation, while Nrf2 remained cytoplasmic in PBS treated BMDMs.

HO-1 Function Regulates TLR9-Driven IL-10 Production

To evaluate if HO-1 regulates IL-10, zinc protoporphyrin (ZnPP), a known inhibitor of HO-1 enzyme function, was used at 3 µM dose (Nowis, et al. (2008) BMC Cancer 8:197). This dose of ZnPP substantially reduced production of IL-10 by BMDMs stimulated with CpG (FIG. 2A). As might be expected with a loss of autocrine IL-10, ZnPP-treated BMDMs produced increased levels of TNFα and IL-6 in response to CpG. HO-1-dependent IL-10 regulation was further validated by shRNA knockdown of HO-1 in the RAW264.7 macrophage cell line. Knockdown of HO-1 expression by about 80% significantly blocked TLR9-induced IL-10 production FIG. 2G). This effect was absent in BMDMs receiving non-specific scrambled shRNA. As with ZnPP, an increase was observed in TNFα by 2.8-fold, but IL-6 was not affected, perhaps due to the differences between BMDM and the RAW cell line.

Finally, BMDMs were made genetically deficient in HO-1 by crossing mice expressing Cre recombinase under the control of the myeloid-specific Lyz2 promoter to mice harboring LoxP sites flanking coding elements of Hmox1

(Schallner, et al. (2015) J. Clin. Invest., 125(7):2609-25). A 50% decrease in IL-10 was observed in HO-1-deleted (HMOX1") BMDM (FIG. 2B) as compared to WT (HMOX1$^{WT}$). ZnPP-mediated HO-1 inhibition blocked IL-10 in HMOX1$^{WT}$ BMDM without showing any effect on the residual IL-10 in HMOX1$^{fl/fl}$ BMDM (FIG. 2B), consistent with a HO-1 specific IL-10 regulation. Thus, using three different approaches to eliminate HO-1 activity or expression, it was demonstrated that TLR9-induced IL-10 production in macrophages is under the control of HO-1.

Exogenous CO Can Rescue IL-10 Production in HO-1 Deficient BMDMs

CO is one of the major products produced by the enzymatic action of HO-1 on heme. Although not one of the canonical signaling molecules thought to control immune function, CO can have an anti-inflammatory role via IL-10 production in a septic mouse model (Uddin, et al. (2015) Med. Inflammation 2015:613249). It was tested whether exogenous CO (in the form of carbon monoxide-releasing molecule [CORM] 2) can rescue IL-10 production that is impaired due to HO-1 inhibition by ZnPP. Indeed, CORM2 restored IL-10 levels to normal in ZnPP treated BMDMs (FIG. 2C). This effect was further validated by demonstrating rescue of IL-10 by CORM2 in HMOX1$^{fl/fl}$ BMDMs. Notably, CORM2 had no additional effect in BMDM that were not inhibited by ZnPP or that were genetically sufficient for HO-1, indicating that endogenous HO-1 provides saturating amounts of CO to drive IL-10 production. These findings provide evidence that TLR9-driven IL-10 production in macrophages is regulated by HO-1 function, at least in part by the product of its enzymatic reaction, CO.

In Vivo TLR9-Driven Serum IL-10 in Mice Correlates with the Gene Dose of Myeloid-HMOX1

To validate in vivo whether myeloid-HO-1 controls systemic IL-10 production, serum IL-10 was measured after activation of TLR9 in mice with different gene dosage of HO-1 gene (HMOX1) in myeloid lineage. Serum IL-10 levels correlated with the myeloid gene dose using a series of three murine genotypes treated with repeated doses of CpG: HMOX1$^{WT}$ (HO-1 intact), HMOX1$^{WT/fl}$ (HO-1 haplodeficient), and HMOX1$^{fl/fl}$ (HO-1-depleted) (FIG. 2D). As expected, with increased copies of intact HMOX1 genes, CpG treatment induced higher serum IL-10 levels (FIG. 2D). Reflecting the biologic relevance of these alterations in IL-10, a correlation of increased IL-12 (FIG. 2E) and IFNγ (FIG. 2F) was observed with the lower IL-10 levels seen in HMOX1 deficient mice.

TLR9 MAS Increases HO-1-Enriched Cellularity in Spleen

Given the data that CpG induced HO-1 protein levels in BMDMs in a TLR9 dependent manner, and the clinical reports that serum HO-1 is increased in patients with hemophagocytic syndromes (Takahashi, et al. (2009) Mod. Rheumatol., 19(3):302-8; Kirino, et al. (2005) Arthritis Res. Ther., 7(3):R616-24), HO-1 levels in the TLR9-MAS murine model were assessed (Behrens, et al. (2011) J. Clin. Invest., 121(6):2264-77). HO-1 constitutively is high in spleen (Braggins, et al. (1986) Biochem. Biophys. Res. Commun., 141(2):528-33; Maines, et al. (1986) J. Biol. Chem., 261(1):411-9). However, whether there are additional increases during TLR9 mediated inflammation is unknown. Relative to PBS-treated control mice, spleens from mice receiving CpG treatment contain a large population of HO-1+ cells as observed by IHC in FIG. 3A and also by the number of HO-1 positive cells score (FIG. 3B). Increased total splenic HO-1 content was also demonstrated by Western blot of spleen lysates from mice receiving CpG treatment (FIGS. 3C-3D). Thus, HO-1 levels are increased in vivo by CpG treatment, in agreement with the in vitro data.

The in vivo HO-1 response could be due to direct effects of TLR9 signaling, or from downstream mediators, in particular IFNγ, which is elevated in these mice and required for disease. IFNγ can act in concert with LPS to induce HO-1 in macrophages (32). It was investigated if IFNγ has any influence on TLR9-driven HO-1 induction in vivo. Wildtype and IFNγ—/— mice were treated with repeated CpG stimulation, additionally including add-back of IFNγ intraperitoneally. A significant increase of HO-1+ cells was observed in CpG injected IFNγ-/- mice, irrespective of exogenous administration of IFNγ. Additionally, IFNγ alone did not induce HO-1 (FIG. 3E). These results indicate that in vivo TLR9 stimulation increases splenic HO-1 expression independent of IFNγ.

MmF Potentiates Endogenous Gain of Nrf2/HO-1 Signaling and Limits MAS Pathology

It was then determined whether increasing myeloid-HO-1 and subsequent IL-10 can counteract inflammation and protect from disease. Specifically, it was determined whether enhancing Nrf2 activity using MMF could augment downstream HO-1 activity and IL-10 levels to suppress IFNγ and MAS pathology. To validate this approach, it was first determined if MMF, a Nrf2/HO-1 inducer (Cho, et al. (2015) J. Neuroinflammation 12:239), could induce HO-1 in spleen macrophages. MMF was injected intra-peritoneally every 12 hours for 3 doses. Spleens were harvested 4 hours after the last dose and plastic adherent macrophages from splenic single cell suspensions were assessed for Nrf2 and HO-1 expression level by Western blot. The immunosignal from Nrf2 and HO-1 relative to DMSO control group was significantly increased by MMF (FIG. 4A). Next, it was determined if MMF therapy could enhance systemic IL-10 production and resolve MAS pathology. MMF or DMSO (control) was injected twice a day with simultaneous CpG injection every other day. On day 10, serum IL-10 was significantly higher in MMF treated mice (FIG. 4B). This was associated with simultaneous drop in proinflammatory cytokines such as IL-12 and IFNγ (FIG. 4B). Additionally, MMF treatment corrected erythrocyte and platelet counts in the blood to control levels seen in mice treated with DMSO alone or MmF alone (FIGS. 4C-4D). MMF treatment also reduced the organomegaly of both spleen and liver (FIGS.

4E-4F), also shown by reduced cellularity in spleen. Together these data establish that MMF increases Nrf2/HO-1 in macrophages, increases serum IL-10 in TLR9-MAS, and protects from multiple manifestations of TLR9-MAS disease activity.

Figure 5A:
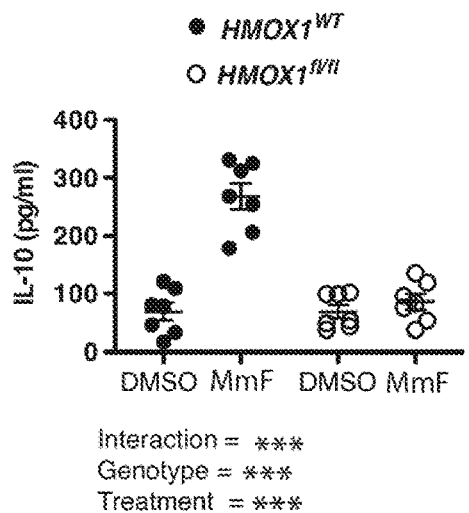
Figure 5B:
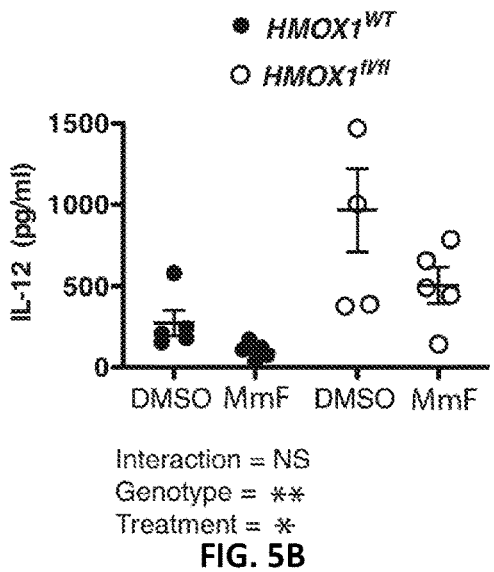
Figure 5C:
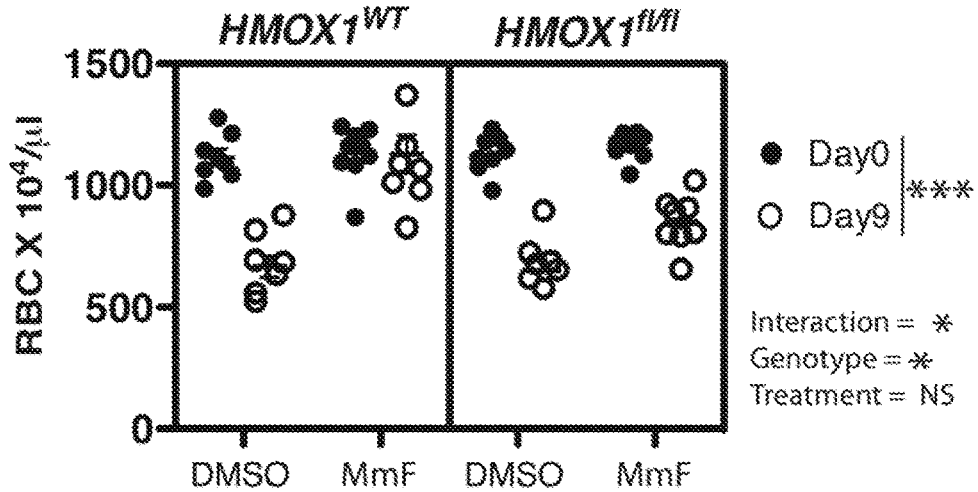
Figure 5D:
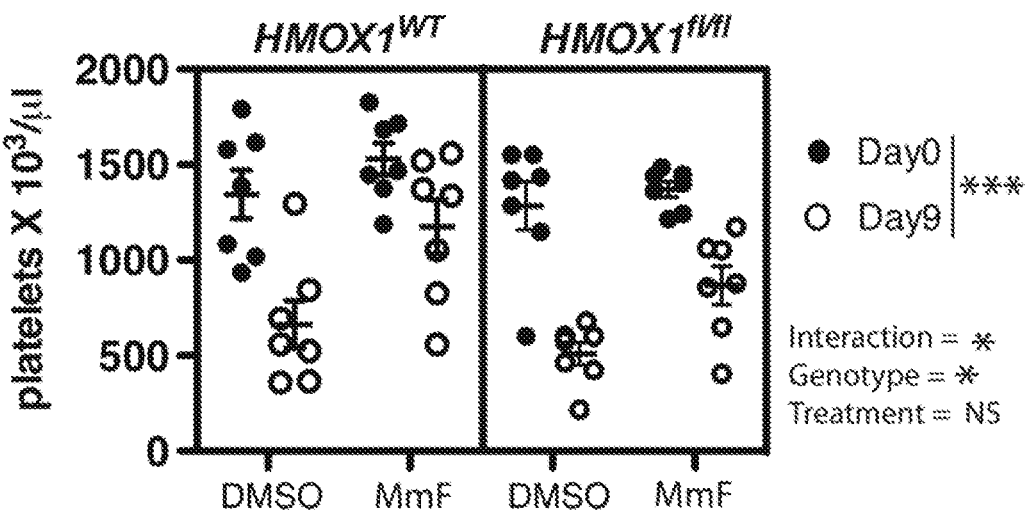

MMF Mediates Its Protective Effects on TLR9-MAS in Large Part Through HO-1 Activity In order to test whether MMF exerts its activity through HO-1, MMF treatments in CpG treated HMOX1$^{WT}$ and HMOX1$^{fl/fl}$ mice were performed. Serum IL-10 was elevated by 3-fold in HMOX1$^{WT}$ mice by MMF, however this effect was completely lost in HMOX1$^{fl/fl}$ mice (FIG. 5A). HMOX1$^{fl/fl}$ mice exhibited a slightly higher amount of IL-12 (FIG. 5B) and IFNγ relative to HMOX1$^{WT}$ mice. IL-12 was slightly reduced by MMF treatment, but in an HO-1 independent manner. IFNγ was unaffected by MMF therapy in these experiments, perhaps owing to the difference in the background of the HMOX1 mice compared to the inbred C57BL/6 mice used in previous experiments. Interestingly, despite this alteration in cytokine levels, the HMOX1$^{fl/fl}$ mice did not have significantly worse disease (FIGS. 5C-5F). Small amounts of IL-10 can remain protective in the TLR9-MAS model, and so the residual IL-10 production seen in HO-1 deficiency both in vitro and in vivo explains why deficient mice do not experience significantly worse disease. While loss of function of HO-1 did not affect disease, gain of function through MMF treatment clearly improved disease parameters. This is noted by almost complete recovery from anemia and thrombocytopenia in MMF treated HMOX1$^{WT}$ and a partial recovery in HMOX1$^{fl/fl}$ mice (FIGS. 5C and 5D) demonstrating the full effect of MMF requires the presence of functional myeloid HO-1.

MMF Improves Organomegaly in a Myeloid-HO-1-Independent Manner

Figure 5E:
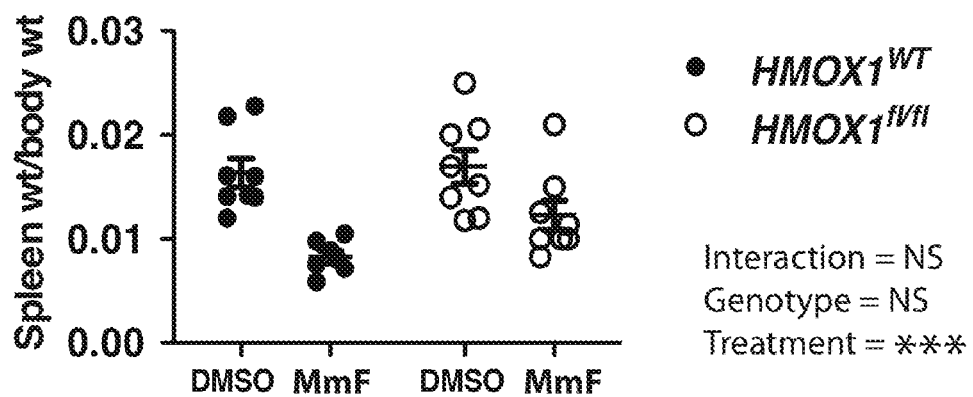
Figure 5F:
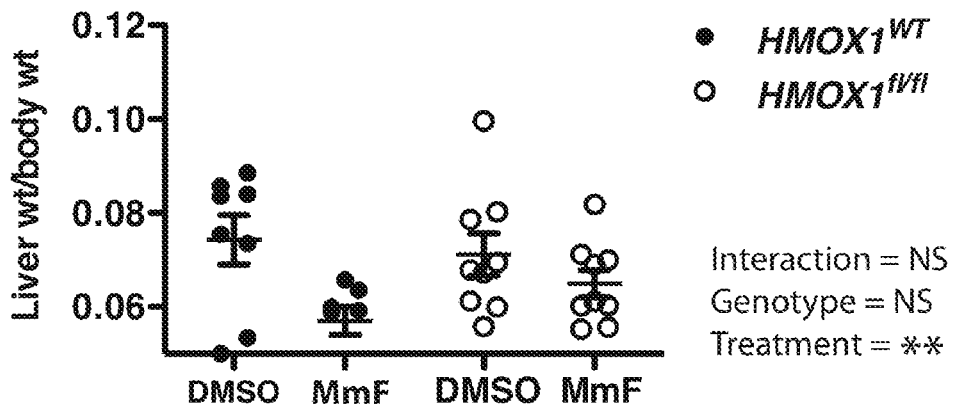

HMOX1$^{fl/fl}$ mice were partially protected from hepatosplenomegaly by MMF, indicating HO-1-independent effect of MMF (FIG. 5E-5F). Livers from WT and HMOX1$^{fl/fl}$ mice were completely normal in appearance at baseline. However, upon CpG treatment, livers from HMOX1$^{fl/fl}$ mice had an increased degree of lobular and portal inflammatory infiltration (FIGS. 6A-6B), indicating a role for endogenous HO-1 in limiting TLR9-MAS induced hepatic inflammation, even though the mice otherwise showed no change in disease parameters noted above. MMF was able to reduce these scores in both WT and HMOX1$^{fl/fl}$ mice, demonstrating a non-HO-1 mechanism for MMF in reducing TLR9-MAS induced hepatic inflammation. Additionally, MMF was able to reduce histologic evidence of endothelial activation independent of mouse genotype (FIG. 6C), also indicating HO-1 independent effects of the drug.

Increases in markers of iron metabolism including hyperferritinemia and excessive serum HO-1 have been well described in hyper-inflammation or cytokine storm. However, functional roles for these molecules in disease progression remain incompletely understood. Herein, the MAS mouse model of repeated TLR9 activation was utilized which exhibits many clinical features of MAS including hyperferritinemia, sustained amplification of tissue inflammatory monocytes and macrophages, cytopenia, organomegaly, and pathology driven by IFNγ. Studying both loss of function using the HMOX1$^{fl/fl}$ mouse and gain of function using MMF, a role for HO-1 in controlling TLR9 induced IL-10 was determined. However, this IL-10 source is redundant, as deleting HMOX1 does not eliminate all IL-10, nor does it result in significantly worsening of disease. Additionally, MMF therapy was able to significantly protect HMOX1$^{fl/fl}$ mice in a number of parameters of disease activity despite the fact that these mice do not increase IL-10 in response to MMF. This indicates that MMF also has at least some IL-10 independent functions.

Like nitric oxide (NO), CO binds the gaseous receptor soluble guanylyl cyclase (sGC), which converts guanosine triphosphate (GTP) to cyclic guanosine monophosphate (cGMP) (Pan, et al. (2017) Scientific Rep., 7:43112; Makino, et al. (2018) Biochemistry 57(10):1620-31). This biochemical step is involved in increased protein phosphorylation by the activation of protein kinases (MAP kinases) and has anti-thrombotic effects, among others (Soni, et al. (2011) Thrombosis Res., 127(6):551-9; Brune, et al. (1987) Mol. Pharm., 32(4):497-504). Herein, a role for CO in the regulation of IL-10 is demonstrated. Treatment with low dose CO (100-125 ppm) was tolerated in early phase clinical trials in patients with idiopathic pulmonary fibrosis or chronic obstructive pulmonary disease (COPD) and was shown to reduce certain aspects of disease pathology (Casanova, et al. (2019) Sci. Rep., 9(1):14802; Gomperts, et al. (2017) Am. J. Hematol., 92(6):569-82). Herein, it is demonstrated in BMDM that the CO releasing molecule CORM2 was able to bypass HO-1 deficiency and rescue TLR9 induced IL-10 production. This indicates a role for HO-1 enzyme activity in IL-10 production via CO. However, CO obviously has a small therapeutic window, and given that the effects of the MMF/Nrf2/HO-1 axis are clearly larger than IL-10 induction.

HO-1 is upregulated by TLR9 stimulation and is required for the majority of IL-10 induced by TLR9 in vitro and in vivo. Loss of HO-1 by monocytes and macrophages resulted in lower IL-10 in TLR9-MAS, but did not significantly affect any of the disease parameters. Treatment with MMF increased HO-1 expression in splenic and peritoneal macrophages. Treatment with MMF during TLR9-MAS significantly improved anemia and splenomegaly, and increased serum IL-10 levels while decreasing IFNγ and IL-12 levels. MMF also protects against anemia and treats organomegaly and tissue inflammation. This improvement was significantly, but only partially, dependent on HO-1 expression in the monocyte/macrophage compartment.

Based on the foregoing, HO-1, a molecule upregulated in hemophagocytes and HLH/MAS, directs inflammation induced IL-10. Targeting Nrf2/HO-1 with an activating drug (MMF) significantly improves TLR9-MAS. Indeed, MMF was effective in reducing a number of disease activity parameters of TLR9-MAS. Furthermore, decreases of the known disease driving cytokines IL-12 and IFNγ were profound. These changes were accompanied by an increase in IL-10. It was also shown that HO-1 plays an important role in regulating IL-10 levels in inflammation, that MMF can increase HO-1 levels, and that the beneficial effects of MMF are partially dependent on HO-1 in the monocyte/macrophage compartment. These results indicate that the parent compound, the FDA approved drug dimethyl fumarate, is an effective MAS therapy and that pharmacologic manipulation of the HO-1/IL-10 axis is an important target for MAS therapies.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A method for inhibiting, treating, and/or preventing macrophage activation syndrome, hemophagocytic lymphohistiocytosis (HLH), or adult-onset Still's disease (ASD) in a subject, said method comprising administering to said subject monomethyl fumarate or a pharmaceutically acceptable salt or prodrug thereof and/or dimethyl fumarate or a pharmaceutically acceptable salt or prodrug thereof.

2. The method of claim 1 for inhibiting, treating, and/or preventing macrophage activation syndrome.

3. The method of claim 1, comprising administering to said subject monomethyl fumarate or a pharmaceutically acceptable salt or prodrug thereof.

4. The method of claim 1, comprising administering to said subject dimethyl fumarate or a pharmaceutically acceptable salt or prodrug thereof.

5. The method of claim 2, further comprising diagnosing macrophage activation syndrome in the subject prior to administration of the therapy.

6. The method of claim 2, further comprising monitoring macrophage activation syndrome in the subject prior to, during, and/or after administration of the therapy.

7. The method of claim 1, further comprising administering at least one other therapeutic for the treatment of macrophage activation syndrome.

8. The method of claim 7, wherein said other therapeutic is selected from the group consisting of corticosteroids, glucocorticoids, cyclosporine A, and interferon gamma (IFN-γ) inhibitors.

* * * * *